United States Patent Office 3,214,189
Patented Oct. 26, 1965

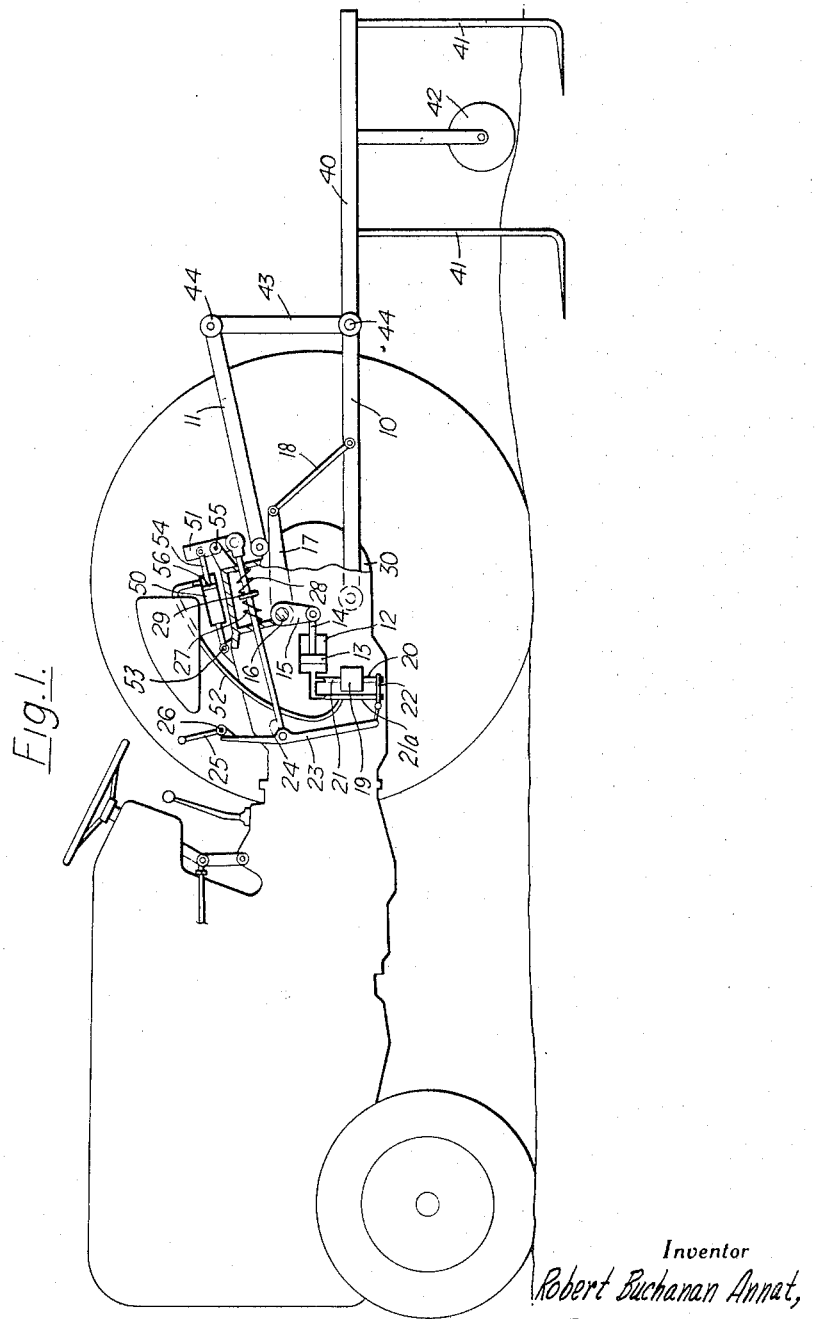

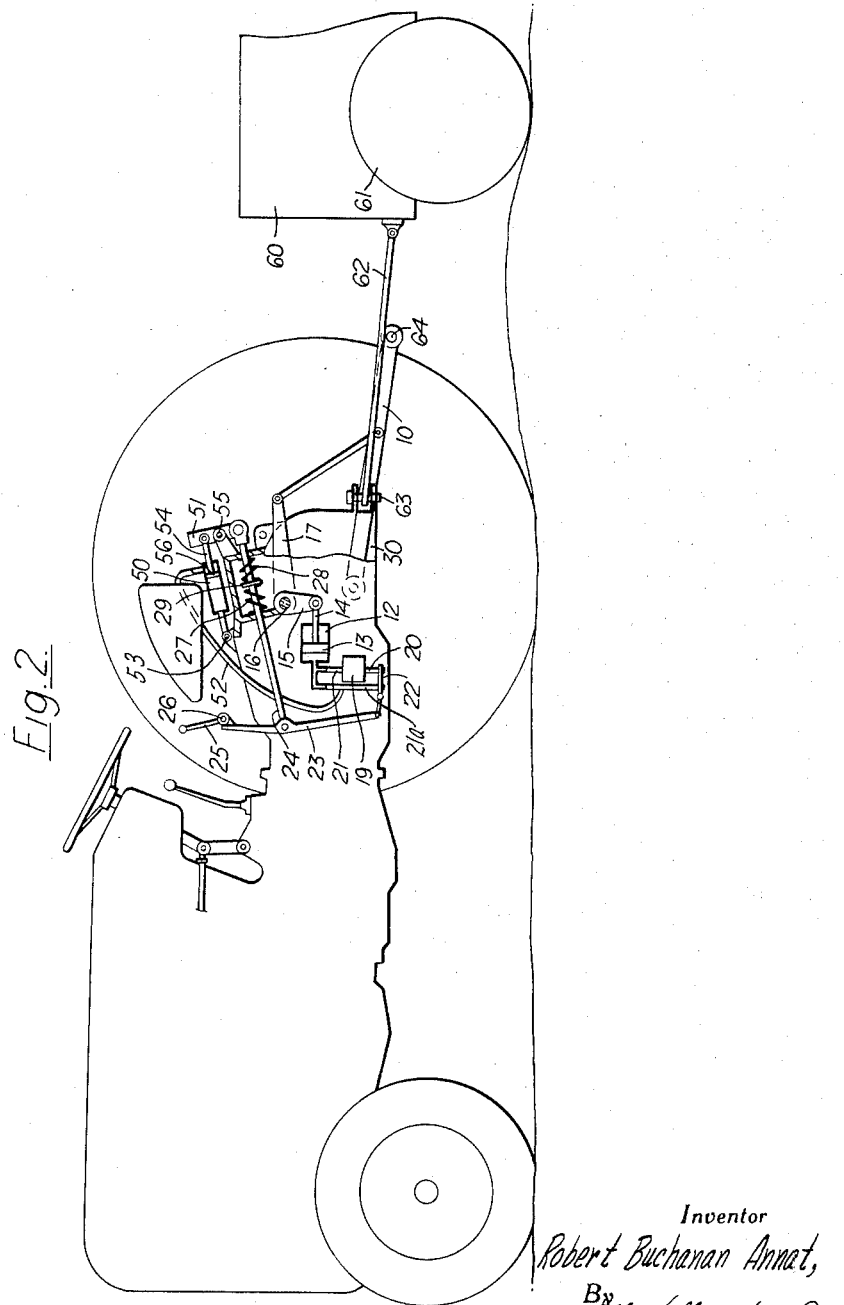

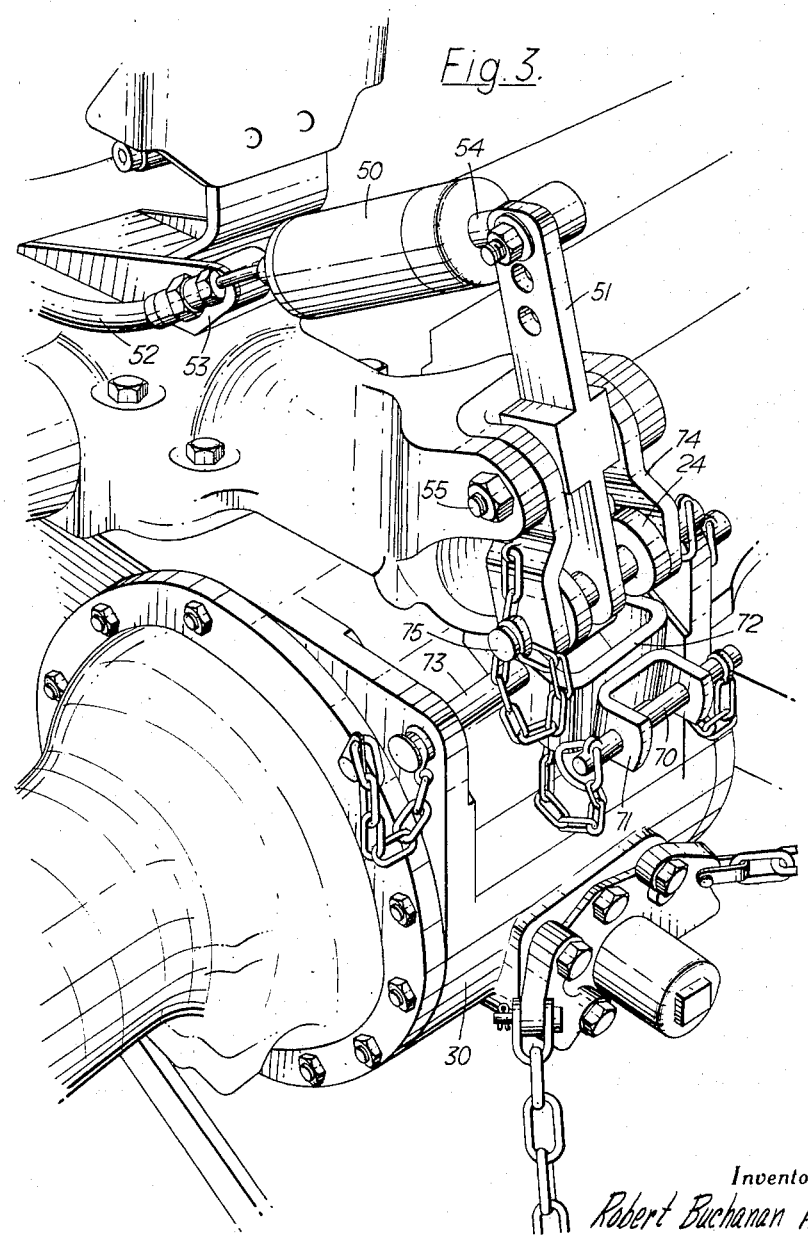

3,214,189
TRACTOR WEIGHT TRANSFER CONTROL
Robert B. Annat, Kenilworth, England, assignor to Massey-Ferguson (United Kingdom) Limited, London, England, a British company
Filed Apr. 8, 1963, Ser. No. 271,347
Claims priority, application Great Britain, Apr. 11, 1962, 13,956/62
2 Claims. (Cl. 280—405)

This invention relates to tractors having hydraulic lift hitch linkages of the "Ferguson system" type and more particularly concerns a weight transfer control for such tractors.

Tractors of this type are provided with a hydraulic ram coupled through drop links to a pair of trailing draft links that connect the tractor to the implement or trailer being moved by the tractor. Conventionally, the load on the hitch linkage is sensed by a control spring, and changes in the position of the control spring are used to control the flow of fluid to and from the ram.

When a trailer or implement having ground engaging wheels is coupled to a tractor of this type, it has been proposed to utilize the ram for transferring a substantial portion of the trailer or implement weight to the rear drive wheels of the tractor. This is usually accomplished by causing the ram to exert a lifting force on the trailer or implement, with the result that the lifted weight is transferred to the tractor rear wheels so as to increase their tractive grip.

It is an object of the invention to provide a tractor of the above type with a control arrangement insuring uniform weight transfer from a trailer or wheeled implement. A collateral object is to provide a control arrangement of this kind which, when used with a ground wheel supported implement, insures substantially constant implement working depth.

Another object is to provide a control arrangement as characterized above that can easily be embodied in tractors of the general type referred to above.

Other objects and advantages of the invention will become apparent upon reading the following detailed description and upon reference to the drawings, in which:

FIGURE 1 is a diagrammatic side elevation, partially in section, of a tractor embodying the invention coupled to a ground wheel supported implement;

FIG. 2 is similar to FIG. 1 and shows the tractor connected to a trailer; and

FIG. 3 is a fragmentary rear quarter perspective of a portion of the control system otherwise appearing diagrammatically in FIGS. 1 and 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to FIG. 1, there is shown a tractor having a hydraulic lift hitch linkage of the "Ferguson system" type. As is typical, the linkage includes a pair of lower trailing draft links 10, only one of which appears in the drawings, and a single upper link 11. A ram consisting of a cylinder 12 containing a piston 13 is mounted within the frame of the tractor and the piston rod 14 is connected to a depending arm 15 on a rotatable cross shaft 16. Lift arms 17 are secured to the cross shaft 16 and drop links 18 extend from the lift arms to the lower draft links 10.

The ram is supplied with fluid from a pump 19 having suction and delivery conduits 20 and 21, respectively, the latter of which is open to the ram cylinder 12. A control valve 22 controls the output of the pump 19 by opening and closing the suction conduit 20 and by exhausting fluid from the ram through a conduit 21a. The valve 22 is operated by a floating lever 23 that is connected to a control rod 24 and which has an upper fulcrum point defined by a cam 26 which may be adjustably positioned by a hand lever 25. A double acting spring device consisting of two mutually opposed compression springs 27 and 28 act upon an intermediate collar 29 secured to the control rod 24.

With possibly one exception, the operation and construction of the parts so far described are quite familiar to those skilled in this art. The exception lies in the fact that the upper link 11 is pivotally anchored to the tractor body 30. Conventionally, the upper link is connected to the control rod, and tension or compression in the upper link reacts against the forces of the springs 27, 28 so as to operate the control valve 22 and maintain a predetermined loading in the upper link. In the present embodiment, however, the upper link, like the lower links, is anchored to the tractor body.

Coupled to the tractor is a ground wheel supported implement in the form of a cultivator which includes a frame 40 carrying rows of soil working tools 41 and a pair of ground engaging wheels 42 of which only one is shown. The frame 40 includes an upstanding subframe 43 and the cultivator is secured to the lower links 10 and the upper link 11 through the usual ball joints 44.

Pursuant to the invention, a hydraulic actuator 50 is anchored to the tractor body 30 and mechanically connected through a lever 51 to the control rod 24. The actuator 50 includes a piston 56 connected to a piston rod 54, and the rod end of the actuator is hydraulically connected by a conduit 52 to the conduit 21a which is on the pressure side of the ram cylinder 12 and the pump 19. Thus, the actuator 50 is subjected to the same hydraulic pressure as is the ram cylinder 12.

The head end of the actuator 50 is pivotally connected at 53 to the tractor body and the piston rod 54 is pivotally connected at the upper end of the lever 51. The lever 51 is fulcrumed between its ends at 55 on the tractor body 30 and is pivotally secured at its lower end to the control rod 24.

In operation, the hand lever 25 is set so that a small proportion of the total downward force exerted by the implement, that force being made up of the implement weight, soil reaction and downward suck, is supported by the ground wheels 42. The remainder of the implement downward forces is transferred to the rear wheels of the tractor by the ram 12 exerting a lifting force on the lift arms 17 which, through the drop links 18, tends to lift the lower draft links 10.

It will thus be understood that any variation of the pressure between the implement wheels 42 and the soil will tend to vary inversely the hydraulic pressure in the ram cylinder 12, with the result that this pressure difference in the cylinder 12 acts as a signal that is transmitted to the actuator 50 and through the lever 51 to the control rod 24 which causes the control valve 22 to make the appropriate adjustment which will return the ram pressure to its initial value. Viewed in another way, the hydraulic pressure in the ram 12 will, because of the actuator 50, remain constant and, hence, the amount of weight transferred from the implement to the tractor will also be maintained at a uniform value.

For example, assume that the wheels 42 of the implement encounter a rise in the ground. The increase in pressure on the wheels 42 will tend to force the draft links 10 upwardly and the hydraulic pressure in the ram 12 will decrease. This simultaneously decreases the pressure in the actuator 50 and the control rod 24, under its spring bias, will shift the lever 23 so that the valve 22 is operated causing the ram to raise the draft links until the system reverts to its previous pressure. In this manner, the rising wheels 42 cause the working depth of the tools 41 to be maintained substantially constant. Conversely, should the wheels 42 encounter a hollow in the ground, a corresponding lowering signal will be sensed by the actuator 50 and transmitted to the valve 22.

In FIG. 2, a four wheel trailer 60 is shown hitched to the tractor with only one of its ground engaging support wheels 61 being illustrated. The trailer includes a drawbar 62 that is pivotally connected in the usual manner at 63 to the body 30 of the tractor. To utilize the invention, the draft links of the tractor are interconnected by a crossbar 64 which is disposed beneath the tractor drawbar 62. Thus, pressure in the ram 12 tending to lift the draft links 10 exerts an uplifting force on the drawbar 62 and, hence, on the leading end of the trailer. The effect of this lifting force is to relieve the front wheels of the trailer of a portion of the trailer weight and to transfer this weight to the rear drive wheels of the tractor.

In operation, passage of the trailer over uneven ground causes the upward reactive pressure of the ground on the front wheels of a trailer to vary and, as in the example discussed above in connection with FIG. 1, corresponding signals are transmitted to the control valve 22 through the actuator 50. Again, these signals function to maintain the hydraulic pressure in the ram 12 constant and, hence, the amount of weight transferred from the trailer to the tractor will also remain uniform.

FIG. 3 illustrates the adaptation of the present invention to a standard type of tractor. In this construction, a pin 70 passing through the jaws of a bracket 71 is provided for securing the upper hitch link 11 to the tractor. The bracket 71 is integrally secured to a second bracket 72 that is anchored on the tractor body 30 by a conventional long pin 73.

In a tractor of the type illustrated, the upper hitch link 11 is normally secured to a suspensory link 74 of inverted U-form and, in the present embodiment, the pin 55 for the link 74 is utilized as the fulcrum for the lever 51. The rear fork of the control rod 24 is, as is normal, connected to a pin 75 extending through the lower ends of the suspensory link 74, and the pin 75 also passes through the bottom end of the lever 51 so as to define a pivotal lower connection therewith.

The actuator 50 is pivotally anchored at 53 to the top of the tractor body and the conduit 52 extends to the front or head end of the actuator and communicates with the rear or rod end of the actuator through an internal pipe, not shown. The rod 54 of the actuator 50 is pivotally connected to one of a plurality of holes provided in the upper end of the lever 51.

I claim as my invention:

1. In a tractor having draft links trailing from a frame and a hydraulic system including a ram coupled to lift the links controlled by a spring-positioned control rod, the improvement comprising, in combination, a hydraulic actuator anchored to the frame of said tractor, means mechanically coupling said actuator to said control rod so that the spring forces on the rod react against the fluid in the actuator, and means hydraulically coupling said ram and said actuator so that the lifting force on the ram is sensed by said control rod.

2. In a tractor having draft links trailing from a frame and a hydraulic system including a ram coupled to lift the links controlled by a spring-positioned control rod extending rearwardly from the frame above the links, the improvement comprising, in combination, a hydraulic actuator pivotally anchored on the top of said frame above said control rod, a lever pivoted on said frame and mechanically coupling the actuator and said control rod, and a hydraulic line connecting the pressure side of said ram and said atcuator so that the lifting force on the ram is sensed by said control rod.

References Cited by the Examiner

UNITED STATES PATENTS 3,073,622   1/63   Merritt _____ 280—405

BENJAMIN HERSH, *Primary Examiner.*

LEO FRIAGLIA, *Examiner.*